UNITED STATES PATENT OFFICE.

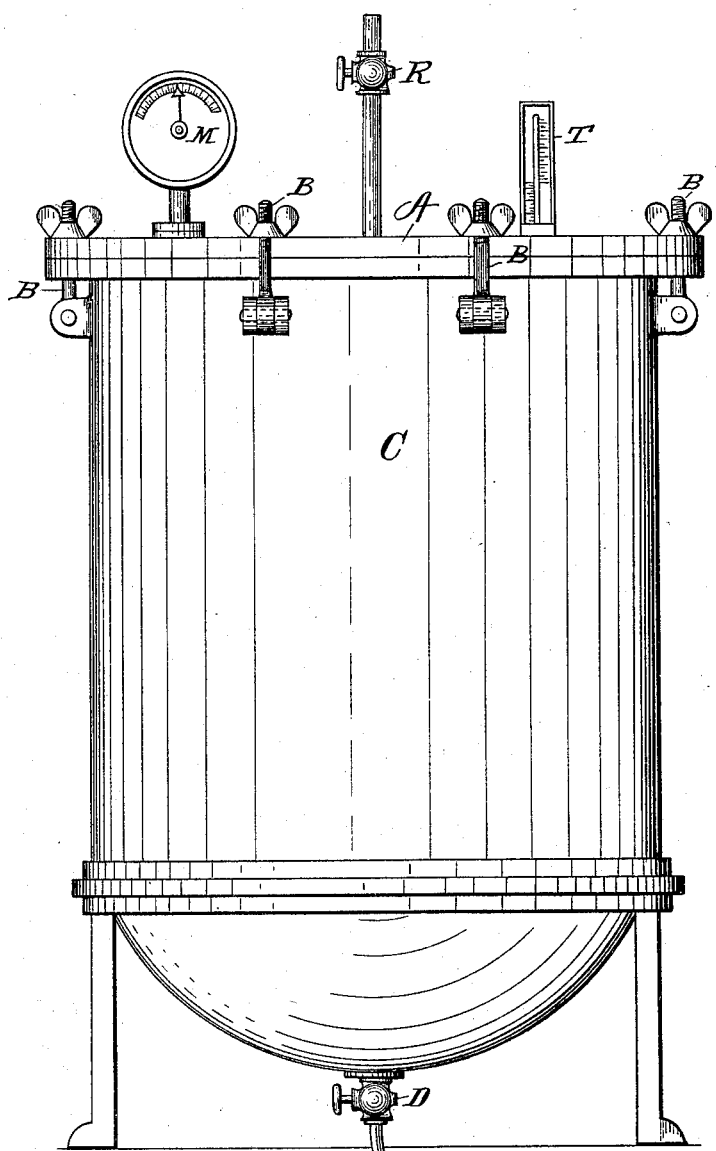

OCTAVE DE SANTA CRUZ, OF VERSAILLES, FRANCE.

PROCESS OF PRESERVING FOOD.

SPECIFICATION forming part of Letters Patent No. 609,590, dated August 23, 1898.

Application filed January 3, 1898. Serial No. 665,285. (No specimens.)

*To all whom it may concern:*

Be it known that I, OCTAVE DE SANTA CRUZ, of Versailles, Department of Seine-et-Oise, France, have invented a new and useful Improvement in Preserving Food, which improvement is fully set forth in the following specification.

The preservation of food depends upon the means employed to prevent the decomposition of the food substance and to prevent external as well as internal fermentation. Having this in view, any possible external fermentation may be suppressed by inclosing the substance to be preserved in an air-tight receptacle or vessel, absolutely excluding air, and internal fermentation may be suppressed to some extent by the introduction of carbonic acid as the most potent of antiseptics. Freezing and refrigeration are the methods most usually employed for preserving meat. The first of these methods is, however, always objectionable on account of its deleterious effect on the quality of the meat by destruction of its tissues and impairing its flavor, whereas the second ceases to be efficacious beyond a short period of time.

Many experiments have proven the inefficiency of carbonic acid to stay internal fermentation at high temperature or in a warm climate and even at a low temperature without high pressure. The sterilizing effects of the carbonic acid in such cases being only superficial, there is nothing to prevent decomposition throughout the more remote interior parts of the meat or other substance. This difficulty is overcome by my present invention by preliminarily exhausting the air from the vessel containing the meat and then subjecting the latter to the action of carbonic acid under pressure, thus causing the carbonic acid to thoroughly permeate the meat and to sterilize even the cellules most remote from the surface, preventing all fermentation or decomposition that might take place from the center outward. The operations are conducted in a maintained low temperature, but at all times above the freezing-point.

Briefly stated, then, my invention consists in sterilizing meat by the combined effects of vacuum, carbonic-acid gas, pressure, and a maintained refrigerating temperature.

By this process meat may be preserved for many days. On opening the vessel after that time it looks just as fresh as it did on the first day. The tissues remain intact, the fat is white and opaque, the meat retains its grain in cooking, and is quite as savory, and yields as much gravy as fresh meat, from which the most delicate palate would not distinguish it. Moreover, meat once subjected to this treatment keeps longer after being removed from the receptacle than meat in its ordinary condition.

Carbonic acid is in no wise detrimental to health. It is employed in many beverages— such as beer, champagne, &c.—as well as in many medicines. Besides, upon opening the vessel the carbonic acid quickly evaporates.

The accompanying drawing shows a receptacle or apparatus in which food may be preserved in accordance with my invention.

In carrying out the invention the piece of meat or other food product is suspended in a receptacle, such as C, (which is preferably sterilized before beginning the operation,) the vessel being provided with a lid A and two valves or cocks D R. The lid is then hermetically closed by means of the bolts and nuts B, the valve D opened, and air exhausted through cock R, forming a vacuum in chamber C and opening up the pores of the meat. The air-exhausting apparatus is then disconnected, cock R closed, and cock D opened and carbonic acid admitted therethrough, and the contents of the vessel submitted to a pressure of several atmospheres (indicated by pressure-gage M) for about one-quarter of an hour, whereby the carbonic acid is caused to thoroughly penetrate and saturate even the most remote pores or tissues of the meat. The valve R may at first be left open, so that any remaining particles of air may be expelled by the carbonic-acid gas. The valve D is then closed. It is sometimes desirable to repeat the application of carbonic-acid gas after an interval. Next the apparatus is deposited in some place sure of a regular temperature from 2° to 3° above zero, centigrade, (indicated by thermometer T.) After a time (dependent on the size and character of the food articles) sufficient to insure complete penetration by the carbonic-acid gas the pressure may be reduced by permitting the escape of some of the contained gas. The process is now complete up to the day fixed for the term of preservation, when the apparatus may be opened and its contents withdrawn. Whether this be after one or two weeks or thirty or sixty days the result is always the same. The meat (or other food product) is found in a perfect state of preservation, and when removed from the apparatus will keep fresh for a period of six or ten days and resist in astonishing manner the atmospheric influences, which would not be the case with fresh meats. It is preferable to employ in carrying out my invention liquefied carbonic-acid gas as sold in trade in tubes at a pressure of sixty atmospheres.

Having thus described my invention, what I claim as new, and desire to secure by Letters Patent, is—

The preservation of food by using the combined and simultaneous action of vacuum, carbonic acid under pressure and cold, that is to say, by submitting such chilled food in a hermetically-sealed vessel to the action of carbonic acid applied and retained under pressure, the food thus being at a refrigerating temperature without freezing, and such refrigerating temperature being maintained throughout such treatment, substantially as described.

In testimony whereof I have signed this specification in the presence of two subscribing witnesses.

OCTAVE DE SANTA CRUZ.

Witnesses:
EDWARD P. MACLEAN,
JOHN S. ABERCROMBIE.